United States Patent [19]
Gerndt

[11] 4,113,345
[45] Sep. 12, 1978

[54] BRANCHING ARRANGEMENT FOR COMMUNICATION TRANSMISSION LINKS HAVING OPTICAL GLASS FIBERS

[75] Inventor: Christian Gerndt, Geretsried, Germany

[73] Assignee: Siemens Aktiengesellschaft, Berlin & Munich, Germany

[21] Appl. No.: 635,366

[22] Filed: Nov. 26, 1975

[30] Foreign Application Priority Data
Nov. 29, 1974 [DE] Fed. Rep. of Germany ....... 2456619

[51] Int. Cl.² .................................................. G02B 5/14
[52] U.S. Cl. ............................... 350/96.15; 350/96.21; 350/96.24
[58] Field of Search ............... 350/96 C, 96 B, 96 WG

[56] References Cited
U.S. PATENT DOCUMENTS

| | | | |
|---|---|---|---|
| 3,556,635 | 1/1971 | Schrenk et al. | 350/96 WG X |
| 3,579,316 | 5/1971 | Dyott et al. | 350/96 C X |
| 3,777,149 | 12/1973 | Marcatili | 350/96 WG X |
| 3,819,249 | 6/1974 | Borner et al. | 350/96 WG |
| 3,887,264 | 6/1975 | Kompfner | 350/96 C X |
| 3,902,786 | 9/1975 | Brown | 350/96 C |
| 3,904,269 | 9/1975 | Lebduska et al. | 350/96 C |
| 3,933,455 | 1/1976 | Chown | 350/96 C X |

*Primary Examiner*—John K. Corbin
*Assistant Examiner*—John D. Lee
*Attorney, Agent, or Firm*—Hill, Gross, Simpson, Van Santen, Steadman, Chiara & Simpson

[57] ABSTRACT

A branching arrangement for communication transmission links having a branching zone between an incoming cladded optical glass fiber and a plurality of outgoing cladded optical glass fibers with each of the glass fibers having a core enclosed in a casing characterized by the glass fibers being free of the cladding in the area of the branching zone, the core of the incoming glass fiber being surrounded by the cores of the outgoing glass fibers with the axes of all of the cores being parallel and the cores of the outgoing glass fibers being separated from the core of the incoming glass fiber by an interposed intermediate material, and the cores of the incoming and outgoing glass fibers and the intermediate material being surrounded by a casing material which has an index of refraction lower than the index of refraction of the cores and the intermediate material having an index of refraction which is approximately equal to the index of refraction of the cores.

6 Claims, 2 Drawing Figures

BRANCHING ARRANGEMENT FOR COMMUNICATION TRANSMISSION LINKS HAVING OPTICAL GLASS FIBERS

BACKGROUND OF THE INVENTION

The present invention is directed to a branching arrangement for use in communication transmission links with a branching zone between an incoming cladded optical glass fiber and a plurality of outgoing cladded glass fibers.

In order to simultaneously supply a plurality of receivers in communication transmission links which utilize optical glass fibers, it is necessary to convey the transmission energy from one transmission channel into another transmission channel or several other transmission channels. To accomplish this task, a branching arrangement is utilized.

SUMMARY OF THE INVENTION

The present invention is directed to providing a branching arrangement in which all adjustment precautions can be dispensed with and which is space-saving and has a simple construction which is economical to produce.

To accomplish this aim, the present invention provides a branching arrangement for communication transmission links having a branching zone between overlapping end portions of an incoming cladded optical glass fiber and at least one outgoing cladded glass fiber with each of the glass fibers having a core enclosed in a cladding. The branching arrangement comprises each of the glass fibers being free of the cladding in the area of the branching zone, the core of the incoming glass fiber being arranged with its axis being parallel to the axis of each of the cores of the outgoing glass fibers, an intermediate material is interposed in the spaces between the cores of the incoming and the outgoing glass fibers, and a casing material surrounding the cores of the glass fibers and the intermediate material, said casing material having an index of refraction $n_U$, which is lower than the index of refraction $n_K$ of the cores and said intermediate material having an index of refraction $n_Z$ which is approximately equal to the index of refraction $n_K$ of the cores. Preferably, the casing material and the intermediate material are of a synthetic material which is formed of a mixture of polymeric hexafluoropropene and vinyl fluoride. Preferably, the ends of the cores of the outgoing glass fibers are arranged to surround the end of the core of the incoming glass fiber and are spaced therefrom by the intermediate material which is transparent.

DESCRIPTION OF THE PREFERRED EMBODIMENT

Figure 1:
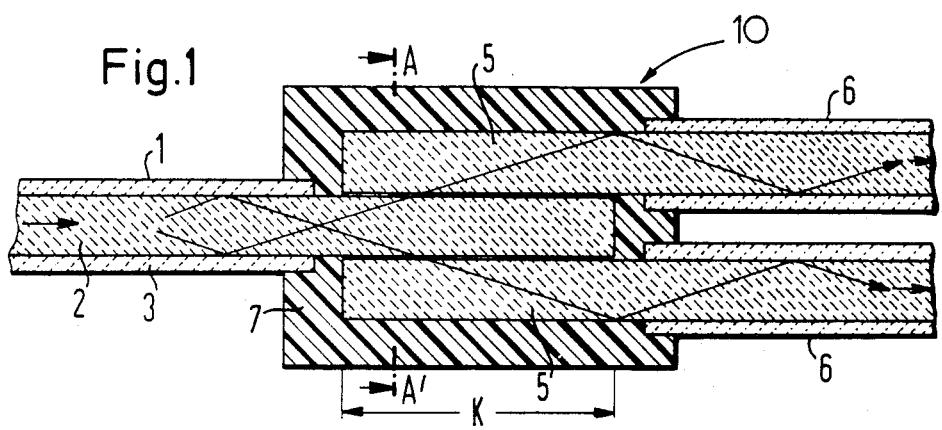
FIG. 1 is a longitudinal cross section of the branching arrangement in accordance with the present invention.

The principles of the present invention are particularly useful when incorporated in a branching arrangement generally indicated at 10 in FIG. 1. The branching arrangement 10 provides a branching zone K between overlapping end portions of an incoming cladded optical glass fiber 1 and one or more outgoing cladded optical glass fibers 6.

The incoming glass fiber 1 has a core 2 with a cladding or coating 3. The core 2 and the coating 3 each consist of glass and have different indices of refraction with the core having a higher index of refraction. In a similar manner, the outgoing glass fibers 6 each have a core 5 which has an index of refraction substantially the same as the core 2 of the incoming glass fiber. All of the fibers 1 and 6 have had their cladding or casing removed from an end or portion which is in the branching zone K. As illustrated, an intermediate material 4 of transparent synthetic material (FIG. 2) completely surrounds the end of the core 2 of the incoming glass fiber and spaces the ends of cores 5 of the outgoing glass fibers 6. As illustrated, the cores 5 are also circumferentially spaced around the core 2 by the intermediate material 4. The intermediate material is formed of a mixture of polymeric hexafluoropropene and vinyl fluoride. The mixture ratio is selected so that the index of refraction $n_Z$ of the intermediate material 4 is substantially equal to the indices of refraction $n_K$ of the cores 2 and 5.

A casing material of synthetic material surrounds the overlapping ends of the cores 2 and 5 and the intermediate material 4. The casing material 7 also is a mixture of the polymeric hexafluoropropene and vinyl fluoride. The ratio of the constituents of the mixture forming the casing material 7 has been selected so that the casing material 7 has an index of refraction $n_U$ which is lower than the index of refraction $n_K$.

In the illustrated arrangement, leakage waves occur in the core 2 of the optical fiber 1 in the branching zone K and pass into the cores 5 of the outgoing optical fibers 6. Since the casing material 7 possesses a lower index of refraction than the cores 5, it is ensured that the light signal will reach the core 5 of the outgoing optical fiber 6. Generally, since the cores 5 do not rest closely upon one another, a light wave supplied in the incoming optical fiber 1 could be emitted to the exterior between the cores 5 of the outgoing fibers. However, this is prevented by the light waves being reflected at the boundaries between the intermediate material which have a higher index of refraction than the casing material 7 which has the lower index of refraction.

Figure 2:
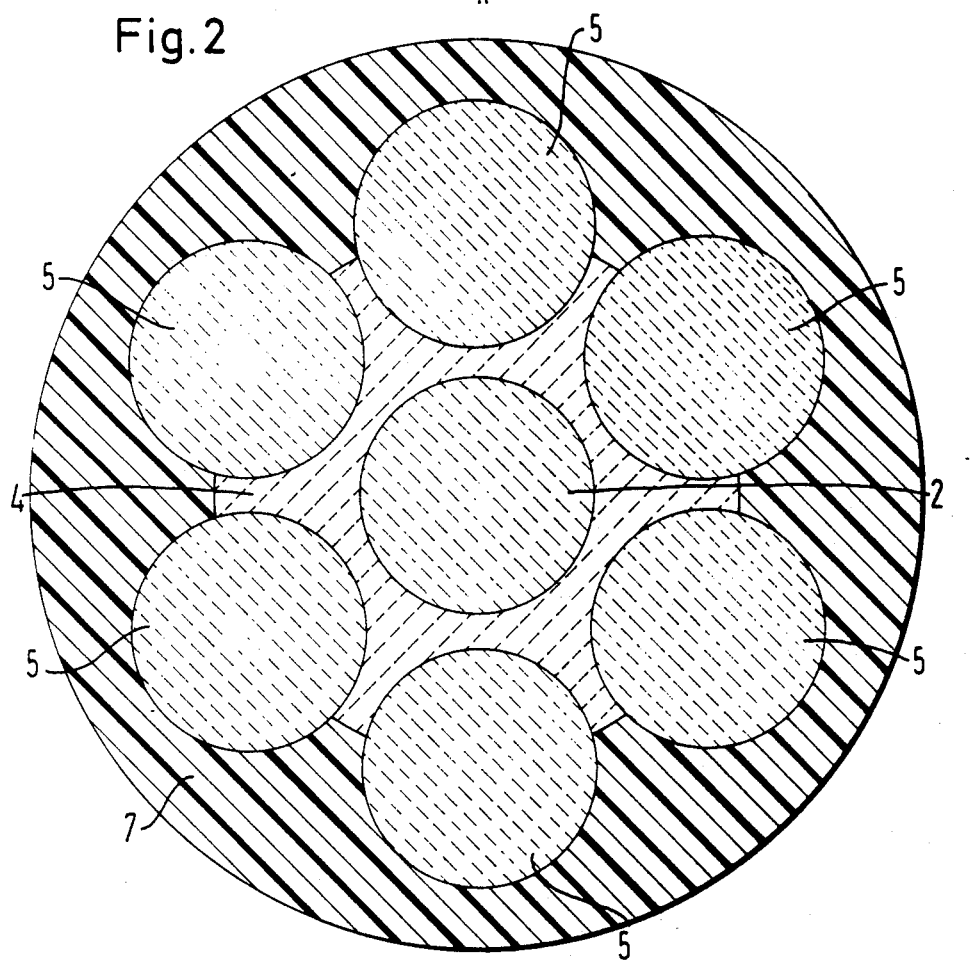
FIG. 2 is a cross section taken along line A-A' of FIG. 1.

If a larger number of branchings is desired, the branching arrangement illustrated in FIGS. 1 and 2 can also be repeated on one or more of the outgoing fibers 6 at a specific distance.

If the incoming and outgoing optical fibers possess a synthetic casing or cladding instead of a glass casing or cladding, the branching arrangement can be constructed from non-encased or cladded fibers and subsequently can be encased over all with a synthetic material whose index of refraction is lower than that of the cores 2 and 5.

The branching arrangement 10 has minimal dimensions and provides space savings. Due to its simple construction of the branching arrangement, it is consequently economical to produce. The physical principle utilized in the branching arrangement 10 is based on a coupling from one fiber to another in a region of the fibers which, on the account of the absence of the fiber cladding, no total reflection will occur.

The synthetic material, which is simple to handle, serves as a casing material. This material must not only have a smaller index of refraction than the index of refraction $n_K$ of the cores, but must also possess adequate transmission over the transmission wavelength.

An advantageous material is one consisting of the mixture of the polymeric hexafluoropropene and the vinyl fluoride. The index of refraction of this mixture may be adjusted by adjusting the ratio of the two constituents of the mixture. This material also has the advantage that its coefficients of expansion, its elasticity, and its adhesion vis-a-vis glass are of a sufficient standard.

An illustrative working example of the branching arrangement 10 is as follows: The glass cores 2 and 5 have an index of refraction $n_K = 1.46$, the intermediate material 4 is a mixture with the ratio of the polymeric hexafluorepropene to vinyl fluoride being 8 : 1 to produce an index of refraction $n_Z = 1.5$, and the casing material 7 is a mixture with the ratio of the polymeric hexafluoropropene to vinyl fluoride being 10 : 1 to produce an index of refraction $n_U = 1.4$.

Although various minor modifications may be suggested by those versed in the art, it should be understood that I wish to employ within the scope of the patent granted hereon, all such modifications as reasonably and properly come within the scope of my contribution to the art.

I claim:

1. A branching arrangement for communication transmission links having a branching zone between overlapping end portions of an incoming cladded optical glass fiber and a plurality of outgoing cladded optical glass fibers, each of the glass fibers having a core enclosed in the cladding, said arrangement comprising each of the end portions of the glass fibers being completely free of the cladding in the area of the branching zone, a plurality of outgoing glass fibers being arranged with their cladding-free cores in a surrounding and overlapping relationship to the cladding-free core of the incoming glass fiber with the core of the incoming glass fiber being arranged with its axis parallel to the axis of each of the cores of the outgoing glass fibers, an intermediate material being disposed in the spaces between the overlapping cores of the incoming and the outgoing glass fibers, and a casing material surrounding the overlapping cores of all the glass fibers and the intermediate material, said casing material having an index of refraction $n_U$ which is lower than the index of refraction of $n_K$ of the cores and said intermediate material having an index of refraction $n_Z$ which is approximately equal to the index of refraction $n_K$ of the cores so that a light signal in the incoming glass fiber is transferred into each of the outgoing glass fibers.

2. A branching arrangement according to claim 1, wherein the casing material and the intermediate material is a synthetic material.

3. A branching arrangement according to claim 2, wherein the synthetic material used for both of the casing material and the intermediate material are different mixtures of polymeric hexafluoropropene and vinyl fluoride.

4. A branching arrangement according to claim 3, wherein the mixture for the casing material has a different ratio than the ratio for the mixture of the intermediate material.

5. A branching arrangement according to claim 1, wherein the overlapping portions of the cores of the outgoing fibers are spaced by the intermediate material from the core of the incoming fiber.

6. A branching arrangement according to claim 5, wherein the overlapping portions of the cores of the outgoing fibers are circumferentially spaced around the core of the incoming fiber by said intermediate material.

* * * * *